United States Patent
Greenquist et al.

(10) Patent No.: US 8,083,617 B2
(45) Date of Patent: Dec. 27, 2011

(54) PORTABLE GOLF SPECTATOR INFORMATION SYSTEM

(75) Inventors: Chad Joseph Greenquist, Hudson, WI (US); Jason Alan Doolittle, Maple Grove, MN (US)

(73) Assignee: CG Holdings, LLC, Hudson, WI (US)

( * ) Notice: Subject to any disclaimer, the term of this patent is extended or adjusted under 35 U.S.C. 154(b) by 1284 days.

(21) Appl. No.: 11/540,823

(22) Filed: Sep. 30, 2006

(65) Prior Publication Data

US 2008/0092202 A1    Apr. 17, 2008

(51) Int. Cl.
   *A63B 57/00*    (2006.01)
(52) U.S. Cl. .................................................. 473/407
(58) Field of Classification Search ................ 473/407; 340/568.1, 568.6, 572.1; 273/317.2
   See application file for complete search history.

(56) References Cited

U.S. PATENT DOCUMENTS

| | | | |
|---|---|---|---|
| 5,245,537 A | 9/1993 | Barber | |
| 5,305,201 A | 4/1994 | Matthews | |
| 5,844,483 A * | 12/1998 | Boley | 340/568.6 |
| 6,366,205 B1 * | 4/2002 | Sutphen | 340/568.6 |
| 6,411,211 B1 * | 6/2002 | Boley et al. | 340/568.6 |
| 6,774,792 B1 * | 8/2004 | Williams | 340/568.6 |
| 7,746,227 B2 * | 6/2010 | Keays | 340/568.6 |
| 2002/0027524 A1 | 3/2002 | Pippin | |
| 2002/0072815 A1 | 6/2002 | McDonough et al. | |
| 2002/0082122 A1 | 6/2002 | Pippin et al. | |
| 2002/0161461 A1 | 10/2002 | Loob et al. | |
| 2002/0187844 A1 | 12/2002 | Vickers et al. | |
| 2003/0191547 A1 * | 10/2003 | Morse | 700/91 |
| 2004/0147329 A1 | 7/2004 | Meadows et al. | |
| 2008/0182685 A1 * | 7/2008 | Marty et al. | 473/407 |
| 2009/0233735 A1 * | 9/2009 | Savarese et al. | 473/407 |

FOREIGN PATENT DOCUMENTS

WO    WO01/97926 A1    12/2001
WO    WO2005050521 A1    6/2005

* cited by examiner

*Primary Examiner* — Ronald Laneau
(74) *Attorney, Agent, or Firm* — Berggren Law Offices, LLC; William R. Berggren

(57) ABSTRACT

A system for conveying viewer-selected information to viewers of a golf tournament includes a group of external input signals, a command facility, and a remote device able to convey viewer-selected information to the viewer. The external signals are from a group that includes at least a real-time identity of a club that a player is using. The remote viewing device is able to convey transmitted visual information and includes (1) a means for receiving transmitted signals conveying visual information, (2) a means for displaying selected visual information, and (3) a means to enable a viewer to select the visual information desired to be displayed from a group including at least the real-time identity of the club that a selected player has had removed from a golf bag used by the player.

34 Claims, 23 Drawing Sheets

PORTABLE GOLF SPECTATOR INFORMATION SYSTEM

FIELD OF THE INVENTION

This invention relates to golf tournaments and devices and systems to increase enjoyment of golf tournament spectators.

BACKGROUND OF THE INVENTION

There is a need to increase information that is available to viewers of golf tournaments and particularly to spectators. Distance-to-pin and club selection are two particularly important factors in a golf tournament.

Presently, golf enthusiasts are in a quandary. If they attend a golf tournament to observe a particular player, as spectators they are restricted from carrying devices that may distract players, including, for example, internet accessible electronics, radios, cell phones and cameras. Thus spectators cannot get real-time information about a particular player they are watching, or find out in a timely manner how other players are performing or how the player they are watching is doing relative to how others typically perform on a particular hole. Golf enthusiasts with internet access can monitor a great deal of information about selected players but not real-time information including, for example, club selection or distance hit. Data is entered into databases by spotters and made available after a hole is played and does not include information about what club is used. Thus golf enthusiasts must choose between (1) real-time but limited information by attending a tournament and watching one or two players and (2) somewhat delayed information through internet or televised outlets. If golf enthusiasts watch a televised show to observe various players and overall tournament progress, the enthusiasts are unable to watch how a particular player performs throughout the tournament since broadcasters determine which player is televised and for how long. If they watch the internet, it is like watching a delayed report of a basketball game instead of watching it live.

Various systems and devices have been disclosed to assist golfers but these devices are meant to assist a golf player or allow a golf course to better manage player movements. Some keyed-input portable devices tied to external databases allow members of a golf club to keep track of distance from a pin or hazards on the club's course using selected reference lines, club performance statistics and members' past performance with a portable hand-held device in communication with a club database to assist selection of a club to use for a current shot. Some use portable global positioning system (GPS) signals to locate distances between golfer and pin or hazards while others use hybrid systems of cart mounted devices and portable hand-held devices to achieve more accuracy over just portable devices. Other unobtrusive location transmitting devices assist efficient use of golf courses by tracking golf cart or golf bag movement of all players on a course. Still others are portable computer devices with software and GPS capabilities that provide virtual caddie services of distances to pin or hazard, club selection and past performance statistics derived from input of past golf experiences. None are designed to provide spectators with spectator selected information about players or other desirable information.

There is still a need for a system to permit golf tournament viewers to follow more real-time actions of selected golf players of their choice while having access to real time information about the progress of other players. There is also a need to allow golf tournament spectators to watch selected golf players of their choice while having access to real time information about the progress of other players on other holes of the tournament.

SUMMARY OF THE INVENTION

We have invented a system for conveying viewer-selected information to viewers of a golf tournament that includes a group of external input signals, a command facility, and a remote device able to convey viewer-selected information to the viewer. The external signals are from a group that includes at least a real-time identity of a club that a player is using. The command facility receives the external input information signals and transmits output information signals. The remote viewing device is able to convey transmitted visual information and includes (1) a means for receiving transmitted signals conveying visual information, (2) a means for displaying selected visual information, and (3) a means to enable a viewer to select the visual information desired to be displayed from a group including at least the real-time identity of the club that a selected player has had removed from a golf bag used by the player. The remote device may be a device for receiving and displaying information from a website or a portable information device suitable for use by spectators of a golf tournament.

We have also invented an apparatus that is able to detect real-time use of a golf club by a player. The apparatus is a detecting means and a signaling device, affixed to a golf bag and includes at least two golf clubs with individually identifiable sensors affixed to each club. The detection means is affixed individually to each golf bag for detecting sensors on clubs within range of the detection means. The signaling device is able to transmit identity of missing club when club is no longer proximate to the bag.

Furthermore, we have invented a portable information device for spectators of golf tournaments that include electrical means for receiving information and for selecting what information to view, an electrically-driven display screen for that information, and a power source for energizing the electrical elements of the device. The information received is composed of transmitted visual information signals sent from a command facility. The means for selecting information permits choice in a topical manner by the spectator from a group that includes at least the real-time identity of a club that a selected player has had removed from a golf bag used by the player. The display screen is for conveying visual information and does not have a means for conveying audio information.

In addition, we have invented a method of enhancing awareness of a golf tournament by a golf enthusiast not present that includes obtaining a remoter information device described above, selecting a received visual information signal about a selected player from a group that includes at least the real-time selection of club by the selected player, and selecting information about a different player from a similar group within a short span of time of making the previous selection. Using this method allows a viewer to be aware of real-time progress of more than one player of viewer's choosing on more than one hole over a short span of time.

We have also invented a method of enhancing awareness of a golf tournament by a spectator that includes obtaining a portable viewer information device described above and selecting a received visual information signal by the viewer while viewer is able to watch a particular player on a particular hole. The received information is from a group that includes real-time selection of club by selected player. Using this method allows a viewer to be aware of real-time progress of a player of viewer's choosing including what club is being used to cover what distance.

The invention benefits both tournament promoters and spectators. Promoters can now offer viewers, and particularly spectators, substantially more awareness of the tournament and control over what is watched than previously possible or is available to viewers of a televised transmission of the tournament. A viewer is able to keep informed of the real-time actions and performance of viewer-selected players, even down to what club the player is using at what location on what hole to cover what distance. Moreover, spectators may do the same for a player they are watching while following the movements of another selected player of interest within a short span of time. No longer must viewers be forced to watch (1) only what a broadcaster decides is interesting at a given point of time or (2) limited and delayed information available from current websites. No longer must spectators be forced to choose between two unsatisfying positions: (1) stay near a television set, internet receiving device, or at the club house leader board to have a sense of progress of the overall tournament or (2) follow the movements of a particular two-some or at a particular hole at the expense of knowing what clubs are used for what distances and where players are in the overall standings or what is happening on the rest of the course during the tournament.

BRIEF DESCRIPTION OF THE DRAWINGS

One or more features or preferred forms of the invention are described in the accompanying drawings. The drawings are briefly described below.

DETAILED DESCRIPTION OF SOME EMBODIMENTS OF THE INVENTION

Golf enthusiasts have a great deal of information available to them about particular players and golf holes in today's golf tournaments. Television transmissions provide real-time viewing of events and golfers chosen by broadcasters to be of interest to viewers. Golf tournament internet sites provide more comprehensive player and golf course information for each player and each hole that can be selected by viewer for viewing. But the earliest that actual play information is available to a viewer is at the end of play for a specific hole when the data that an army of observers input into databases is uploaded. This delay is typically as satisfying for a viewer as watching a recording of a football or basketball game instead of seeing the game live. However, the activity going on at each hole covers too great an area for meaningful live viewing of an entire golf tournament.

Spectators of golf tournaments have an even greater dilemma. Currently, spectators are not allowed to possess any electronic devices or other devices that may distract players including anything that may give off a sound or a flash or cause a disturbance such as, for example, internet accessible electronics, radios, cell phones and cameras. Thus spectators can get enjoyment from real-time information about a particular player they are watching without knowing in a timely manner how other players are performing or how the player they are watching is doing relative to how others typically perform on a particular hole.

Our invention includes various aspects to meet the needs of golf enthusiasts that follow golf tournaments and particularly spectators of those golf tournaments. One aspect is a system for conveying information to a viewer of a golf tournament. A second aspect is an apparatus for determining when a golf club is being used by a player. A third aspect is a portable information device to allow a spectator of a golf tournament to follow action around the course while observing movements of one player or one hole. A fourth aspect is a method of enhancing the overall experience of a golf tournament by a spectator.

The system aspect includes a group of external input information signals, a command facility, and a remote device. The system is able to provide information chosen to be displayed by a viewer of a golf tournament. The viewer may be on-site viewing a remote device as he or she watches a particular hole in person or may be off-site viewing the progress of the golf tournament through a remote device connected to the internet.

Figure 1:
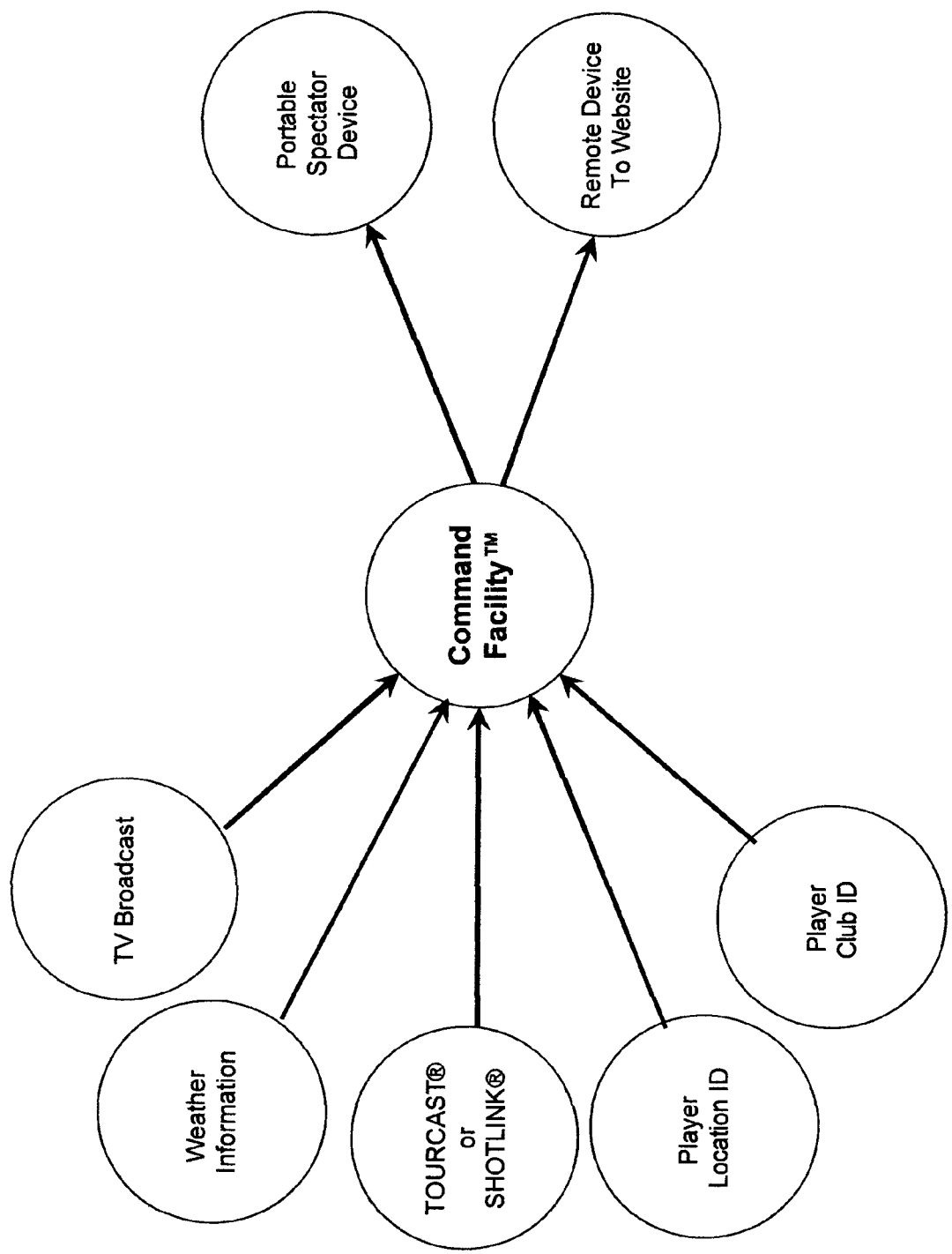
FIG. 1 is a flow diagram of an embodiment of a system of the invention.

FIG. 1 depicts a flow diagram of an embodiment of such a system. Several examples of external signals are shown being transmitted to a command facility. One external signal, in particular, is the signal communicating the real-time identity of the club a player is using. The external signals are received by a command facility that then transmits output information signals. External input information signals may be modified, if necessary, so that the output signals are better able to convey information for subsequent viewing. The transmitted information signals are received by remote devices. The remote devices are able to convey transmitted visual information selected by a viewer. The remote device includes (1) a means for receiving transmitted signals conveying visual information, (2) a means for displaying selected visual information, and (3) a means to enable a viewer to select the visual information desired to be displayed from a group including at least the real-time identity of the club that a selected player has had removed from a golf bag used by the player.

The external signal that communicates the real-time identity of the club a player is using can be sent by several sources. A caddy can signal an onlooker with the information. The onlooker can then electronically transmit the information to the command facility in real-time.

Another source can be sent by the second aspect of the invention, the apparatus for determining when a golf club is being used by a player by signaling what club is being removed or which clubs are present. The apparatus includes a golf bag containing at least two golf clubs, individually identifiable sensors, a detection means, and a signaling device. The sensors are affixed to at least two clubs in the golf bag of a player. In operation, the sensors are data storage units that may store as little as a uniquely identifiable alpha-numeric designation associated with a particular club in a particular bag. Upon receipt of the signal in the command facility, additional data associated with the golf player assigned to that designation and club information, such as club type and manufacturer, may then be combined with the designation before real-time information about what club a player is using is transmitted to remote devices in user-friendly, user accessible format. Alternatively, the unit may also store player and club information that is sent to the command facility when a club is removed from the bag.

Suitable technologies are already used in other industries. One type of technology included, for example, data storage devices such as radio frequency identification devices also known as RFID tags, barcodes or other data storage tags that can be read by remote detection means. Detection means are typically affixed to the golf bag for detecting sensors on clubs within range of detection means. The means are matched to the sensors chosen and include, for example, electronic means for detecting when a sensor is within a specified range or when it passes through an electrical field. Such technologies are presently used to tag and monitor retail merchandise or are similar to Intel® Mote networks. Other sensors and detection means are bar codes and optical scanners similar to those used in grocery stores to tag and monitor food sales. The detection means depending on ranges may be set for ranges less than 4 feet (120 centimeters (cm)). Others may be set for ranges less than 2 feet (60 cm). The signaling device transmits identity of missing club when club is no longer proximate to the bag. Signaling devices suitable to transmit the detected data to the command facility are also well known and generally use analog or digital broadcast means where software determines whether a signal is sent when a club is removed, is constantly sent showing clubs present, or is sent when a club passes though a field. Software can then determine the club identity of interest.

Figure 2:
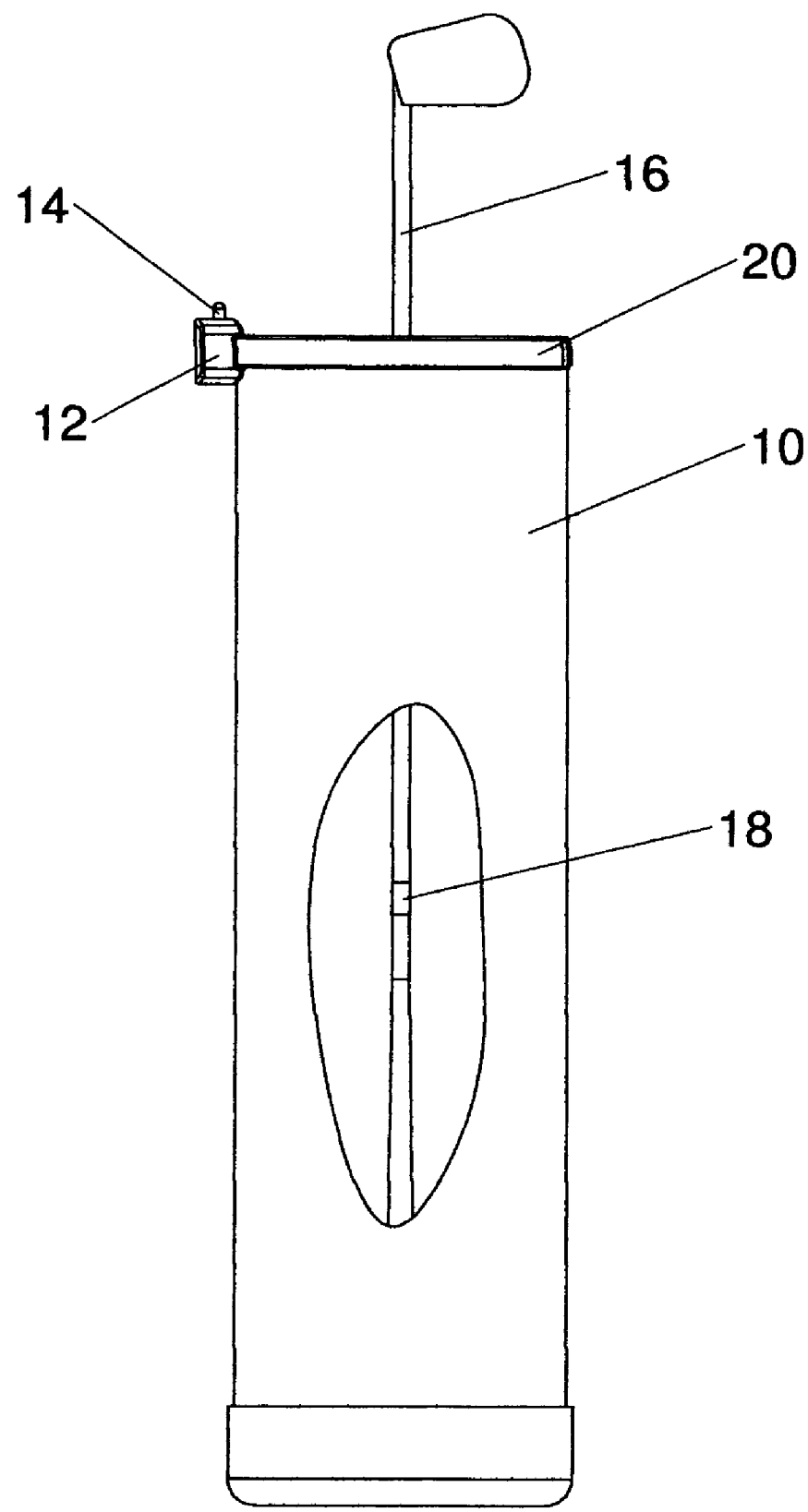
FIG. 2 is a front view of a golf bag with an embodiment of a detection means and signaling device, and a cut-away section showing part of a golf club with an embodiment of an individually identifiable sensor affixed thereto.
Figure 3:
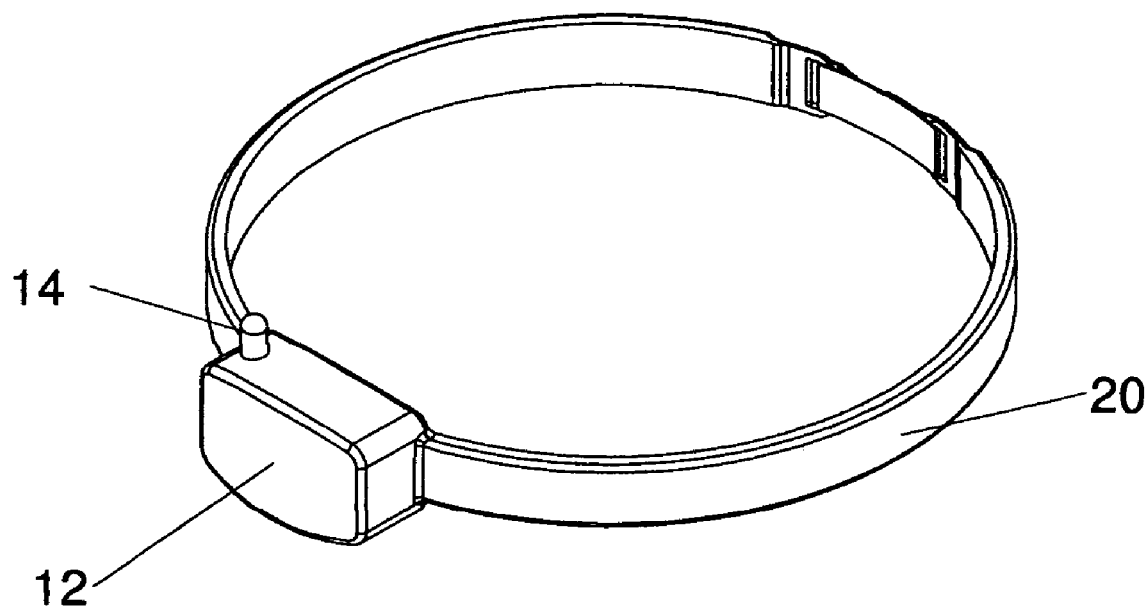
FIG. 3 is a perspective view from the upper right viewpoint of the detection means and signaling device shown in FIG. 2.

FIGS. 2 and 3 illustrate an embodiment of the apparatus of the invention for determining when a golf club is being used by a player. FIG. 2 is a front view of a golf bag (10) with an embodiment of a detection means (12) and signaling device (14), and a cut-away section showing part of a golf club (16) with an embodiment of an individually identifiable sensor (18) affixed thereto. In this embodiment detection means 12 and signaling means 14 are housed in the same compartment. The compartment is affixed to an adjustable band (20) that enables the compartment to be affixed to a golf bag. The band can comprise any means that is useful to affix the compartment to the bag securely enough to remain affixed during the tournament play of golf. Such bands include, for example, elastic bands, rigid plastic bands that compression fit on a bag, or others able to perform a suitable function. FIG. 3 is a perspective view from the upper right viewpoint of the detection means and signaling device shown in FIG. 2.

Another externally transmitted signal is one indicating real-time location of a golf player on a course. Currently spotters note player positions during the play of a hole and report the positions to a command facility when play on a hole is concluded. Thus, golf enthusiasts not watching a hole in person are not able to have access to real-time location information of players of interest and those watching a hole have only a vague awareness of distances and position for the players in sight.

The position locating information may be generated by several technologies similar to those currently employed in other industries or disclosed in patents for golf. One technology is tracking by a Global Positioning System (GPS). A GPS device is placed on each golf bag with a means to communicate position data back to a main database system at the command facility. Communication could be by methods known to industry such as, for example, Wireless Fidelity (WiFi) two-way pager, or telephony means. Another technology is by triangulation. Unique RF signatures could be emitted from devices proximate to each bag and sensed by one or more receiver towers placed around the golf course. The strength of the signal, or data embedded in the signal would indicate the distance from the bag to the tower. Standard triangulation techniques could be employed to identify the position of the bag's transmitter. Directional or omni-directional towers could be used.

The positioning elements may be located in various places and combine information in different ways. The position locating signal system may be separately located on a golf bag or golf cart or may be packaged with the detection means and signaling device used to identify golf club in use. Also location information may be combined with a golf course layout before transmitting to a command facility. Alternatively, transmitted coordinates are transmitted to the command facility and there combined with a map of the golf course to result in a viewer-friendly depiction of the position of the golf player on the course in relation to such other items as hazards, green and pin. Some location techniques have been disclosed to assist golf course operators in tracking golf players or their golf carts similar to that disclosed in US 2002/0027524 A1 (Pippin) and US 2002/0072815 A1 (McDonough et al.), or monitoring flow of golf players to maximize throughput and minimize bottlenecks similar to that disclosed in U.S. Pat. No. 5,305,201 (Mathews).

The externally transmitted information signals of FIG. 1 also may include other sources able to provide a golf enthusiast with access to more complete information. Other external signals include those from the following group: player background information, golf course information, golf hole information, television transmissions with subtitles, leader board information, SHOTLINK®, TOURCAST®, average driving or scoring on a hole, golf tour schedule, golf course background, weather announcements, information related to products used by players and information from tournament sponsors. Some of these signals are currently available to television and cable network facilities and incorporated into broadcasts at the discretion of the transmitting entity. Others are accessible on internet sites by golf enthusiasts but do not provide real-time information. Still others are provided by the golf courses in various formats. Some are presently available to the public.

As mentioned earlier, the command facility receives the input information signals and transmits output information signals. In some embodiments, the command facility also augments the input information with stored files. Such files may include past golf course layout, average club distances obtained with particular clubs, and typical performances of players on given holes. The command facility is able to modify at least some of the external input information signals with information from these files to make the information more spectator-informative before transmitting output information signals able to be received by the remote device.

Output information signals transmitted to remote devices include similar information as that provided by the external signals except in a more user-friendly manner. In addition to real-time information regarding use of clubs by players and location of players on a hole of a course, output information signals also include information of interest to golf enthusiasts and golf spectators. These other output signals include those from the following group: player background information, golf course information, golf hole information, television transmissions with subtitles, leader board information, SHOTLINK®, TOURCAST®, average driving or scoring on a hole, golf tour schedule, golf course background, weather announcements, information related to products used by players and information from tournament sponsors.

In contrast to what is currently known, the system aspect of the invention allows a golf enthusiast to select more information desired by the golf enthusiast and, in particular, provides real-time information not currently available. In addition to providing real-time club identification and golf player location information discussed above, the system provides a menu-driven tree of information chosen by the golf enthusiast and tailored to what golf enthusiasts are interested in viewing. The information allows golf enthusiasts that are not present during a tournament to follow particular golfers through the tournament in a manner that is more informative and real-time than previously available.

The output information is then transmitted to remote devices for watching in a manner controlled by the viewer. One remote site is an internet accessible device able to communicate with a website. In this case, the output information is streamed to a website run by a host. This menu-driven website can be accessed by golf enthusiasts in a manner similar to how they currently access TOURCAST®, owned by Professional Golf Association (PGA), but with real-time information about golf club selection and golfer positions. The remote device is a device able to receive and display information from the website in a selectable manner. These internet accessible devices are well known and include, for example, desktop computers, laptop computers, personal digital assistants (PDAs) and cell phones.

Spectator viewing is often strictly controlled to minimize distractions to players. Typically, electronic devices are not permitted. Examples of these devices include cell phones, radios and portable televisions, or anything else that could access the internet or broadcast television or radio transmissions. Thus spectators do not have access to information available to golf enthusiasts not actually watching a particular golf hole in person. Thus, devices not able to transmit audio signals would lessen the possibilities for distraction.

Another remote device is a portable device, some embodiments of which are particularly useful for spectators. Some embodiments are able to transmit audio and visual information. Other embodiments can only transmit visual information. Some embodiments may also include a transmitting means for transmitting signals from a group consisting of a medical alert to the command facility and silent digital camera images to a receiving site. When cameras are present the receiving site is a memory card or the command facility.

The portable information that is not able to transmit audio signals to a spectator of a golf tournament is a third aspect of the invention. This aspect includes an electrical means for receiving transmitted visual information signals from a command facility, an electrical means for selecting among received visual information signals in a topical manner, an electrically-driven screen, and a power source. The received visual information signals are from a group that includes at least the real-time identity of a club that a selected player has had removed from a golf bag used by the player. The electrically-driven screen for conveying visual information is without a means for conveying audio information. The power source is for energizing the electrical elements of the device.

Figure 4:
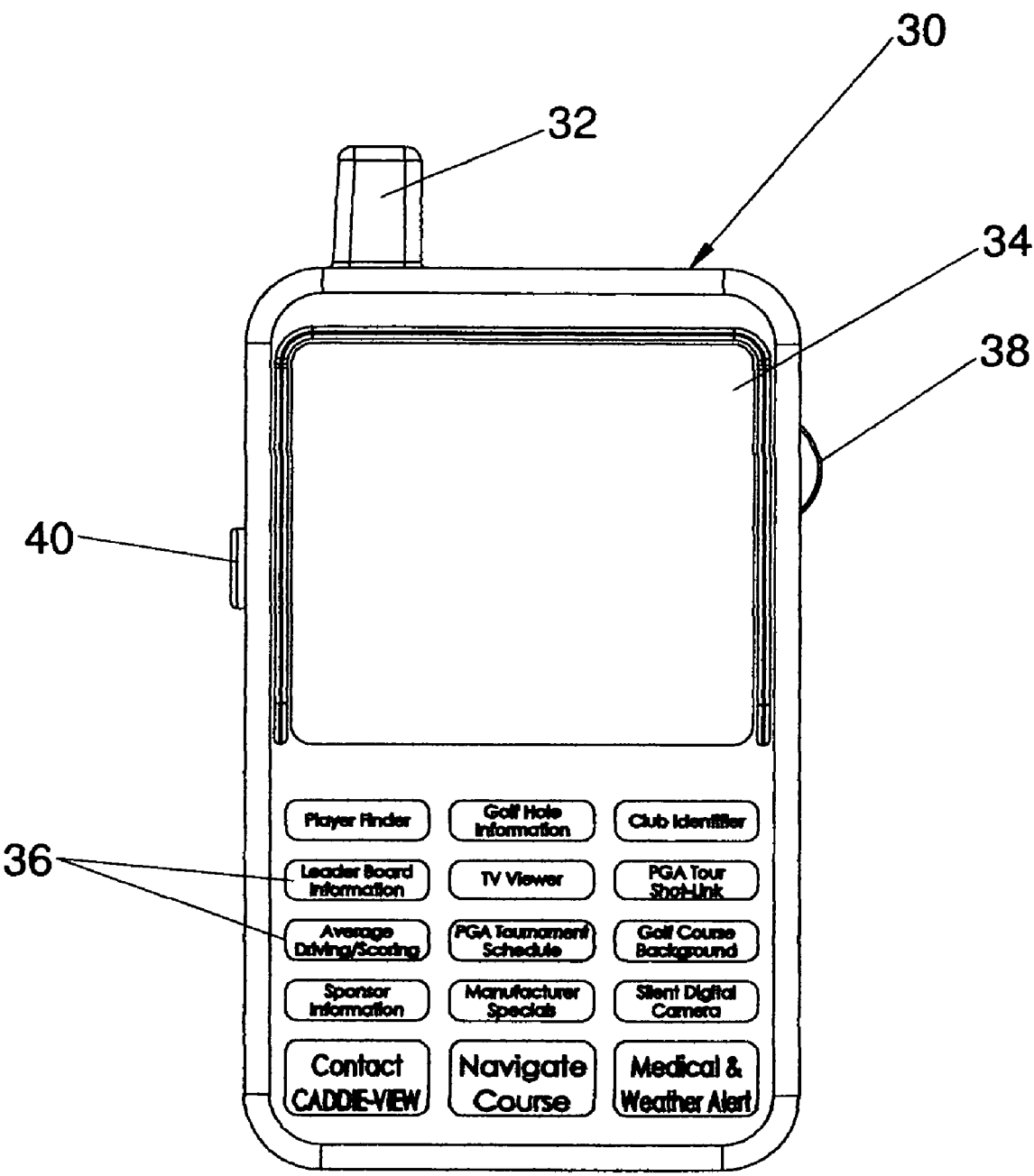
FIG. 4 is a front view of an embodiment of a portable device of the invention with button markings.
Figure 6:
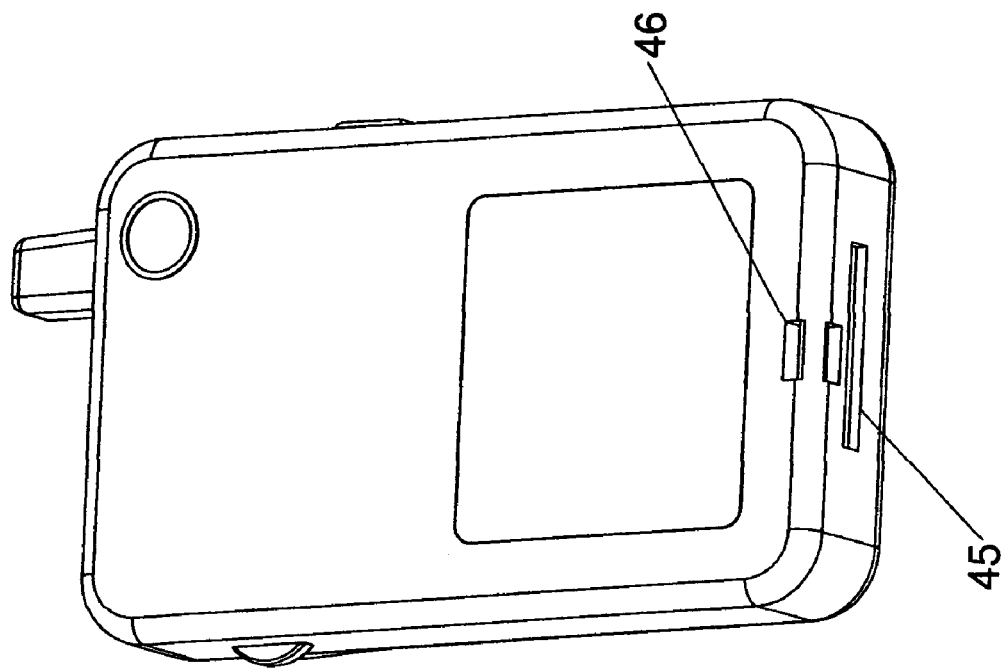
FIG. 6 is a perspective view from the lower left viewpoint of the rear of the embodiment shown in FIG. 4.
Figure 5:
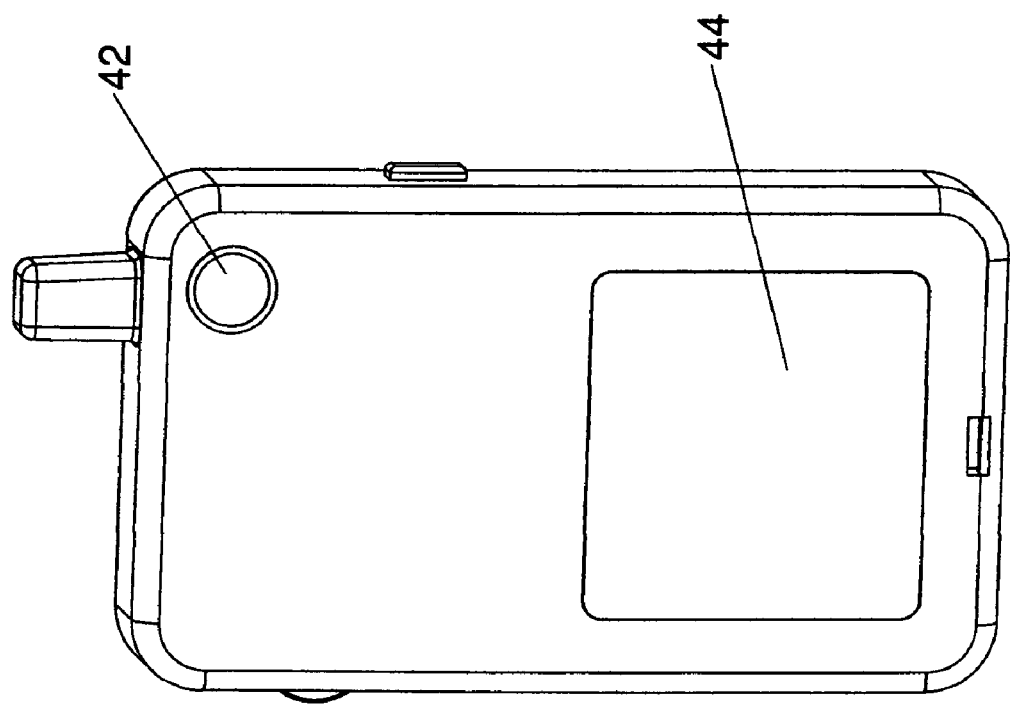
FIG. 5 is a perspective view from the upper right viewpoint of the rear of the embodiment shown in FIG. 4.

FIGS. 4, 5 and 6 are views of an embodiment of a portable device of the invention with button markings. FIG. 3 is a front view of an embodiment of a portable device of the invention with button markings. The portable device (30) is designed to be able to be held in one hand. An optional strap, not shown, may be attached to hang the device from the neck or other part of a person. The device includes an antenna (32) to receive information. Information is displayed on a screen (34). Category buttons (36) containing labels of general topics of interest such as those depicted in the figure allow for a general selection of topics. A menu dial (38) enables one to move up or down the resulting displayed menu. A Yes/No selector switch (40) is to select the topic to be displayed or go back to the previously viewed menu. FIG. 5 is a perspective view from the upper right viewpoint of the rear of the embodiment shown in FIG. 4. A camera (42) allows one to capture pictures of interest. The pictures may be sent to the command facility at a specific account associated with the particular portable device for later pickup. Alternatively, the pictures may be saved in a device such as a memory card for later downloading to another device for spectator use or printing of the pictures. A power supply cover (44) protects the power supply for the device. Power may come from commonly available sources such as batteries used for such devices as laptop computers, movie cameras and PDAs. Additionally, a power/data socket (45) is provided to permit users to perform such functions as (1) recharging battery packs, (2) downloading data such as digital pictures, and (3) uploading files such as a course layout. A strap hook (46) is provided to attach a strap for carrying device 30. Suitable straps include those commonly used with movie and still cameras. FIG. 6 is a perspective view from the lower left viewpoint of the rear of the embodiment shown in FIG. 4.

Figure 7:
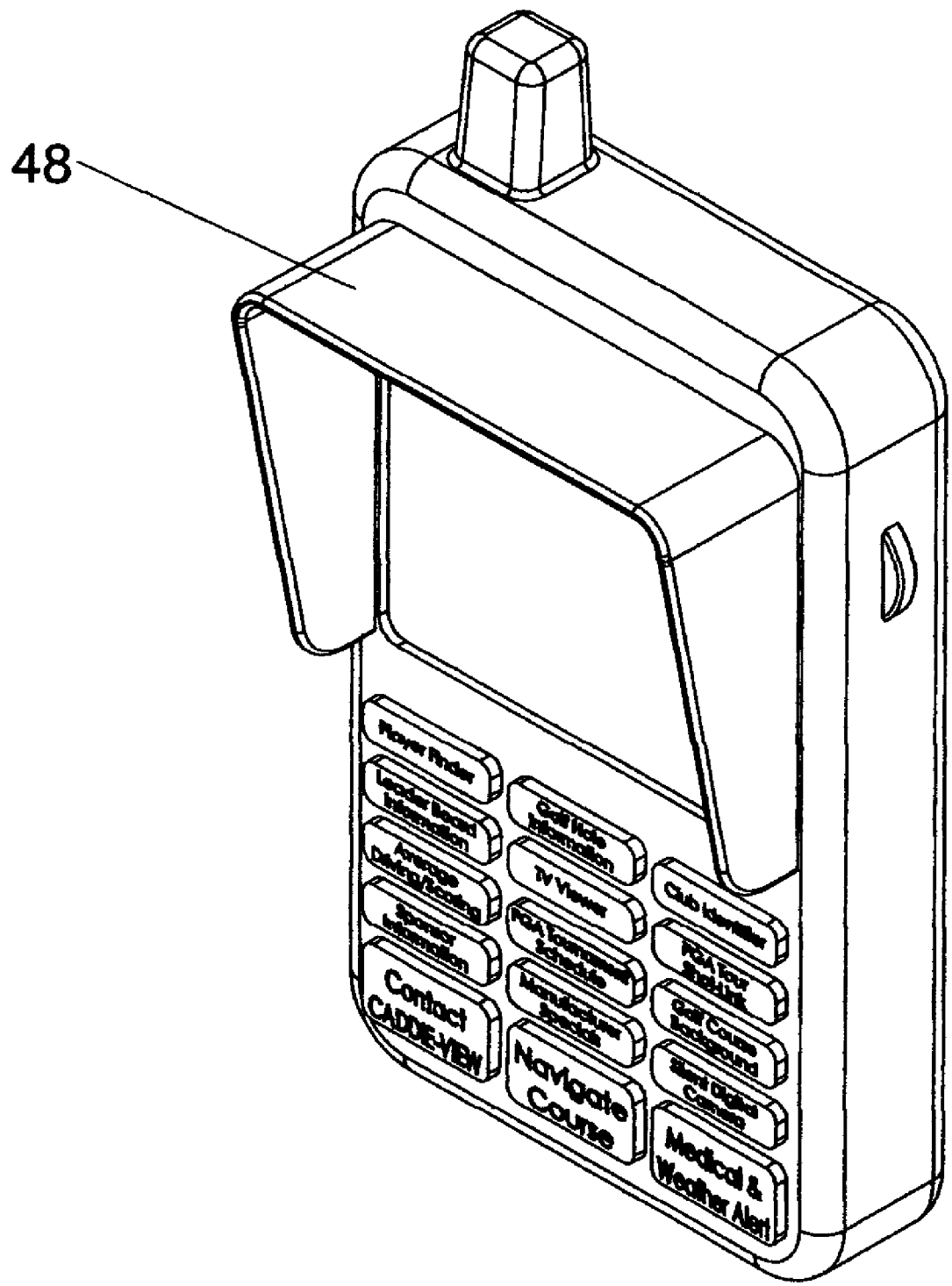
FIG. 7 is a perspective view from the upper right viewpoint of the rear of another embodiment of a portable device of the invention with button markings and display glare shield.
Figure 8:
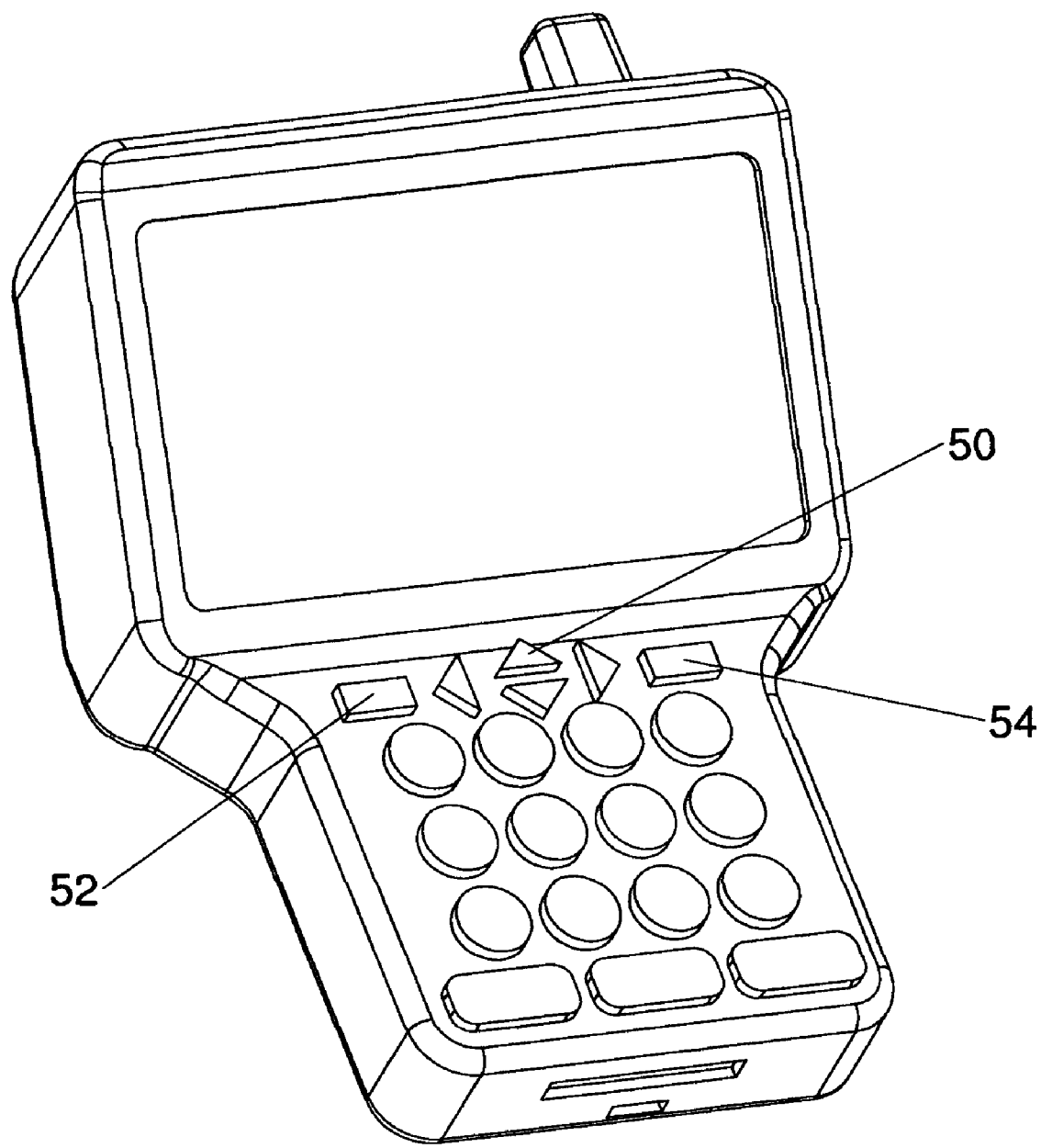
FIG. 8 is a perspective view from the lower left viewpoint of the front of another embodiment of a portable device of the invention without button markings.

Other embodiments of the portable device are also shown. FIG. 7 is a perspective view from the upper right viewpoint of the rear of another embodiment of a portable device of the invention with button markings and display glare shield. A light shield (48) enhances the ability of a person to view the display screen on sunny days. FIG. 8 is a perspective view from the lower left viewpoint of the front of another embodiment of a portable device of the invention without button markings. This embodiment has arrow buttons (50) to maneuver among topics and categories, a separate "No" button (52) to go from a selected information display to a previously viewed menu and a separate "Yes" button (54) to select a topic for viewing. In addition, display screen 34 is larger.

Figure 9:
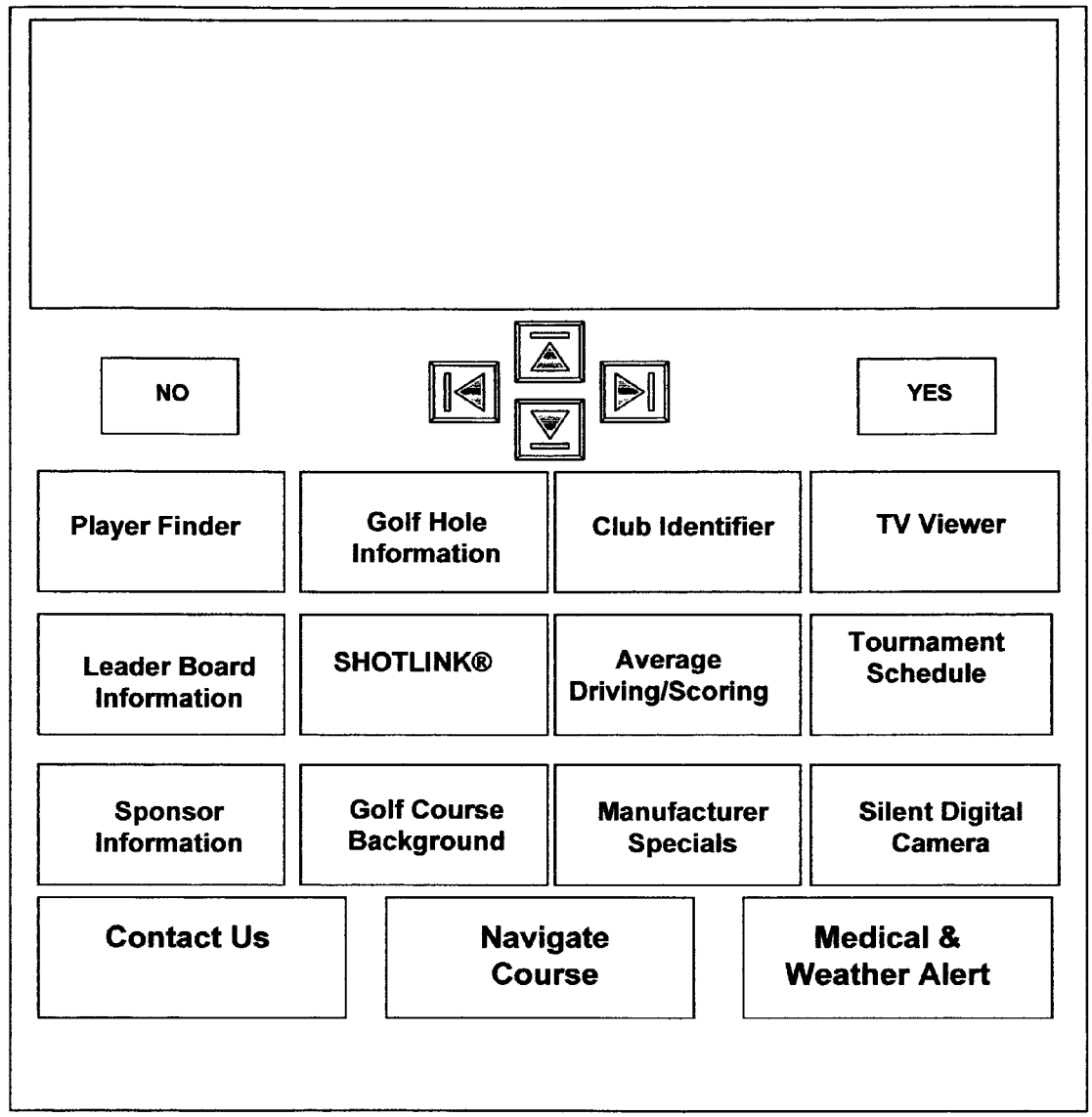
FIG. 9 is a schematic drawing of the front display of the embodiment shown in FIG. 8.
Figure 10:
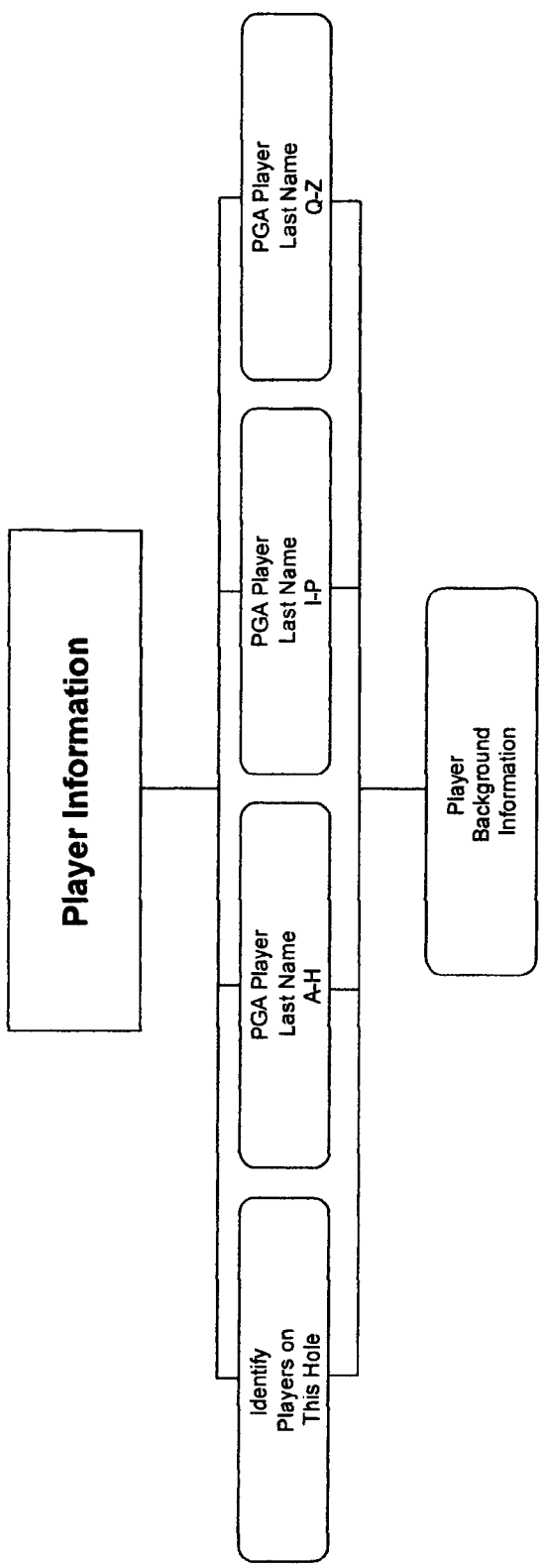
FIG. 10 is a flow diagram of views available for the button marked "Player Finder" of the embodiment shown in FIG. 8.
Figure 11:
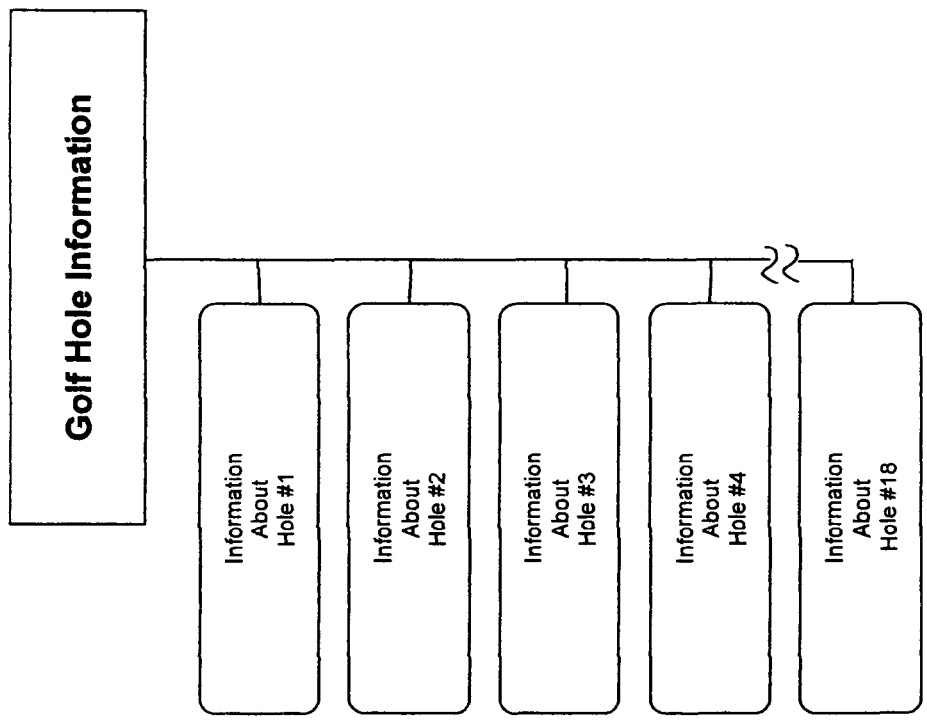
FIG. 11 is a flow diagram of views available for the button marked "Golf Hole Information" of the embodiment shown in FIG. 8.
Figure 12:
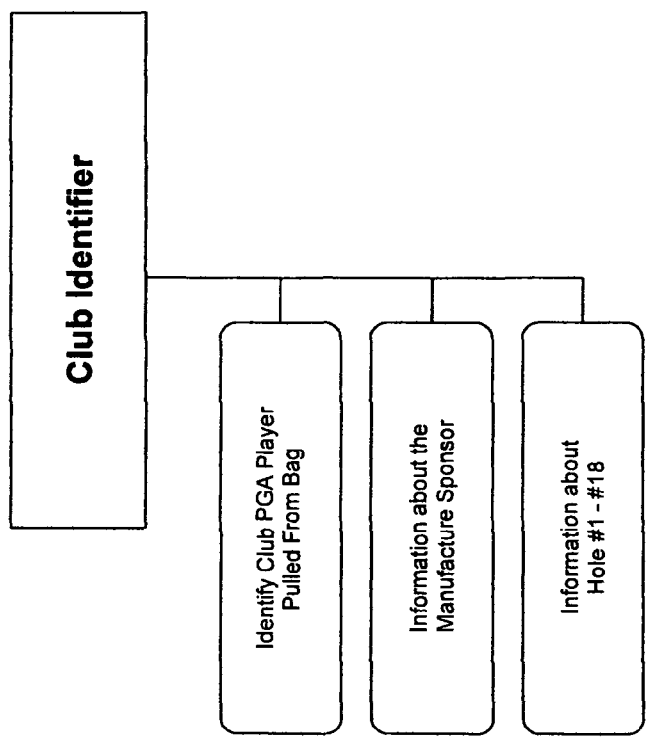
FIG. 12 is a flow diagram of views available for the button marked "Club Identifier" of the embodiment shown in FIG. 8.
Figure 13:
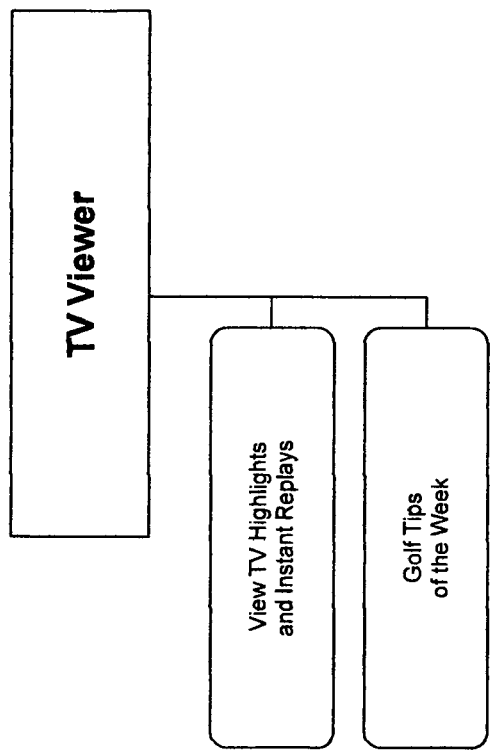
FIG. 13 is a flow diagram of views available for the button marked "TV Viewer" of the embodiment shown in FIG. 8.
Figure 14:
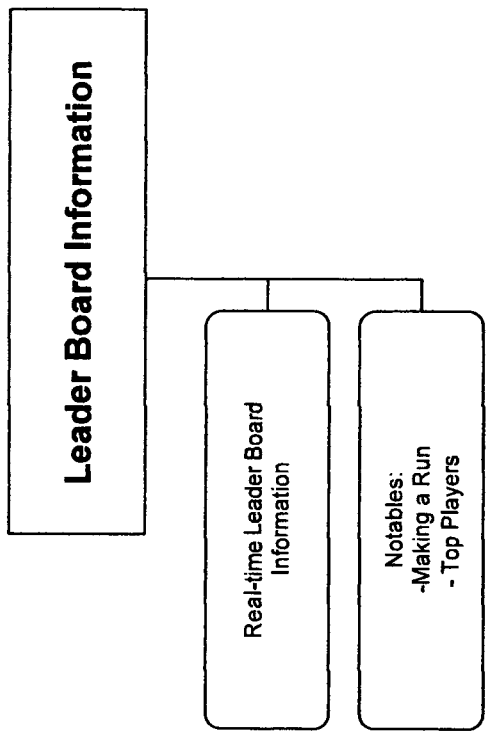
FIG. 14 is a flow diagram of views available for the button marked "Leader Board Information" of the embodiment shown in FIG. 8.
Figure 15:
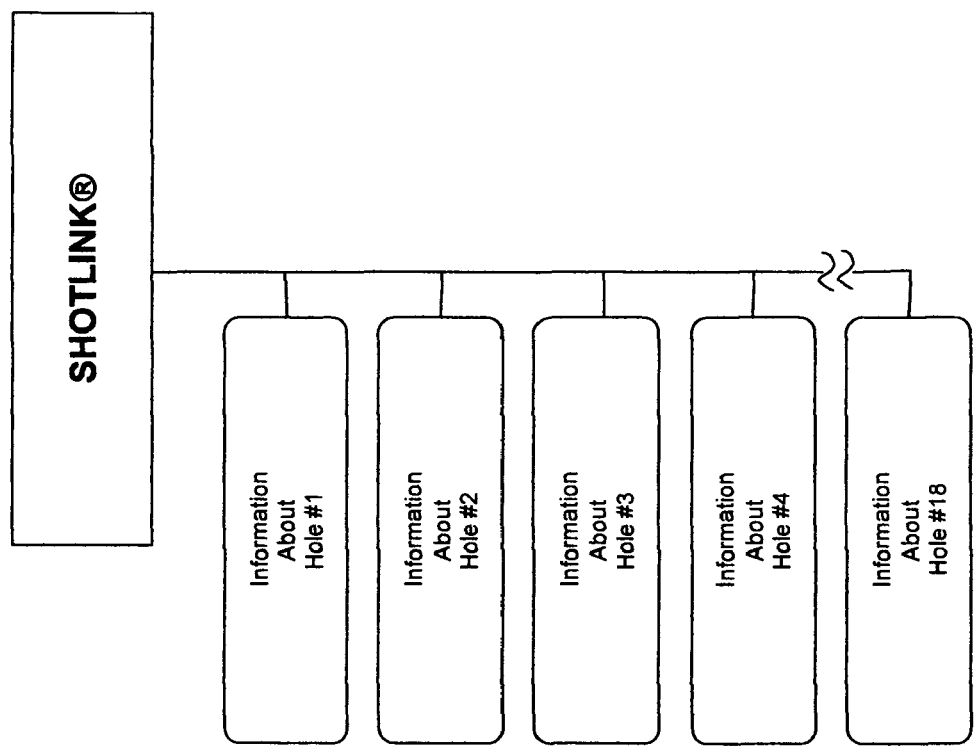
FIG. 15 is a flow diagram of views available for the button marked "SHOTLINK®" of the embodiment shown in FIG. 8.
Figure 16:
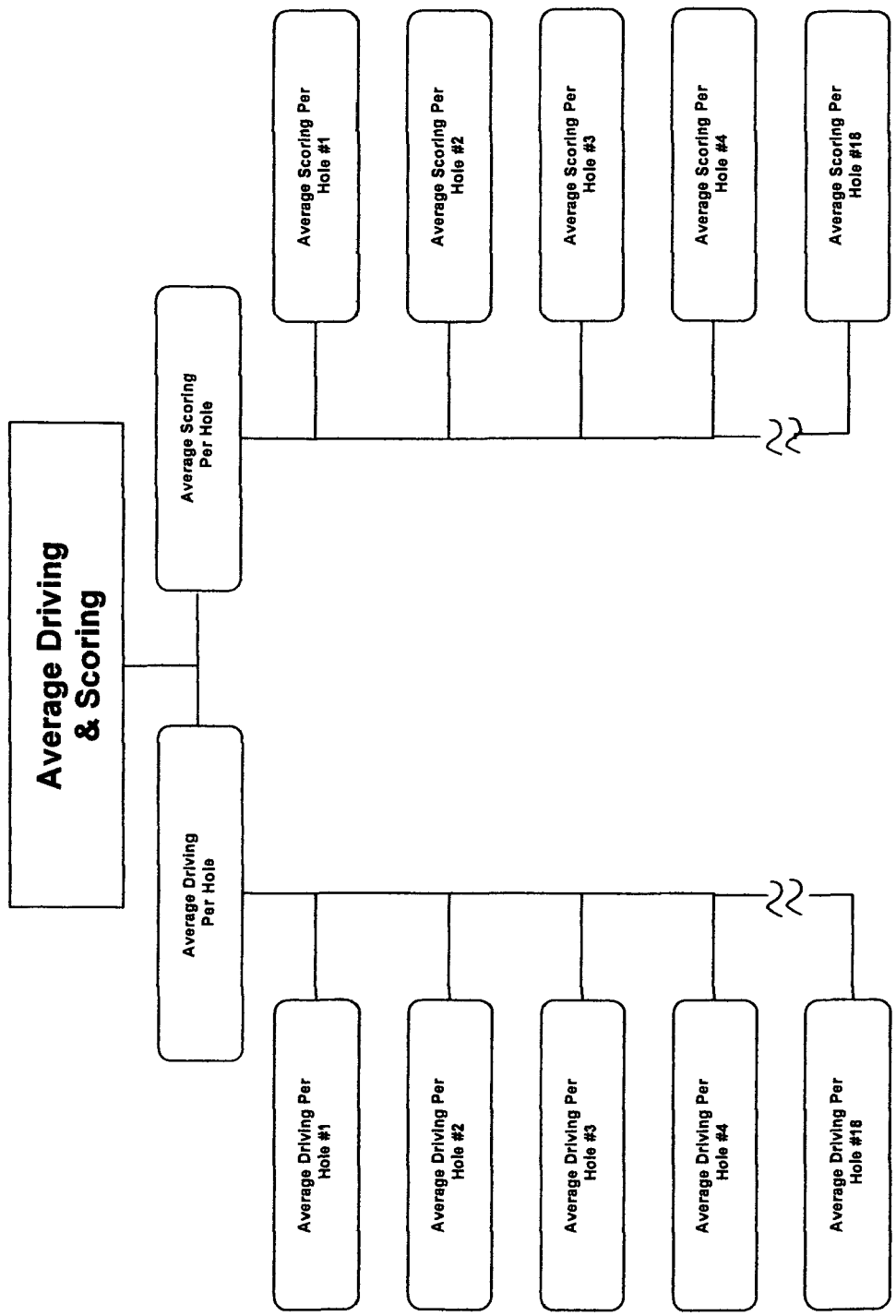
FIG. 16 is a flow diagram of views available for the button marked "Average Driving/Scoring" of the embodiment shown in FIG. 8.
Figure 17:
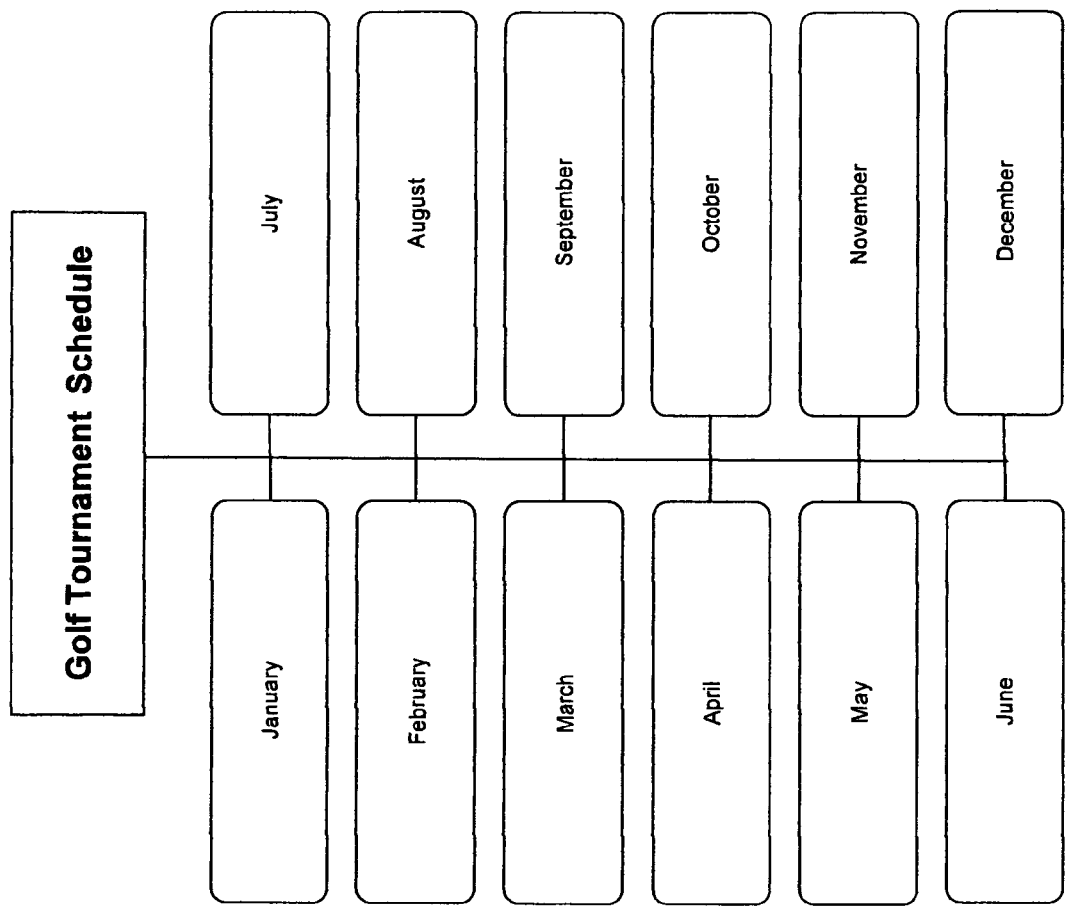
FIG. 17 is a flow diagram of views available for the button marked "Golf Tour Schedule" of the embodiment shown in FIG. 8.
Figure 18:
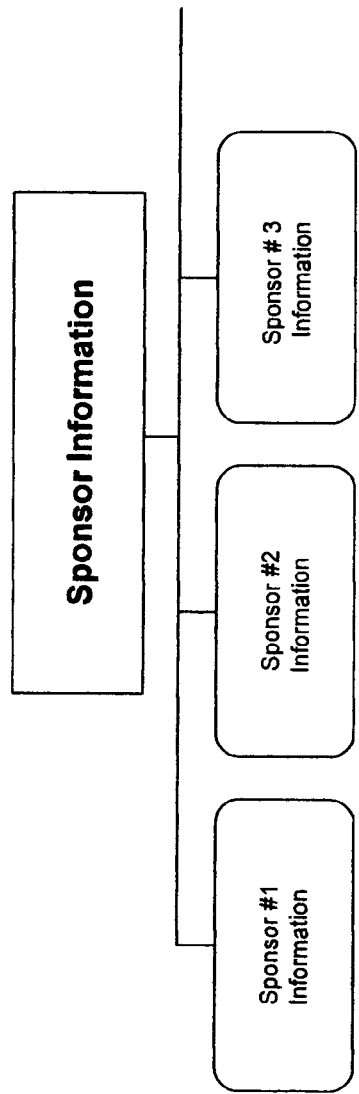
FIG. 18 is a flow diagram of views available for the button marked "Sponsor Information" of the embodiment shown in FIG. 8.
Figure 19:
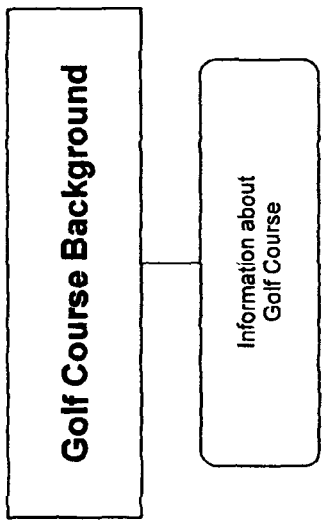
FIG. 19 is a flow diagram of views available for the button marked "Golf Course Background" of the embodiment shown in FIG. 8.
Figure 20:
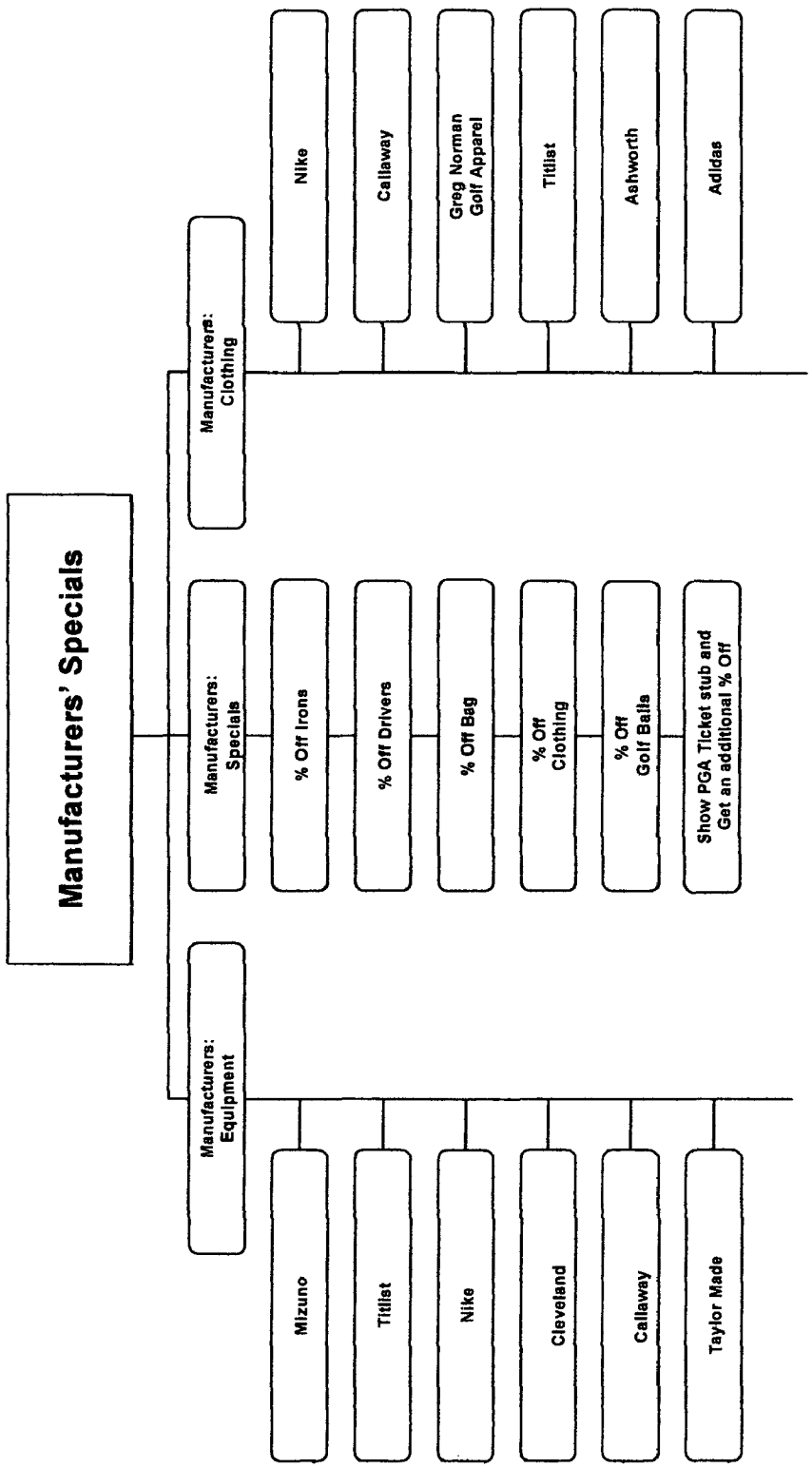
FIG. 20 is a flow diagram of views available for the button marked "Manufacturer Specials" of the embodiment shown in FIG. 8.
Figure 21:
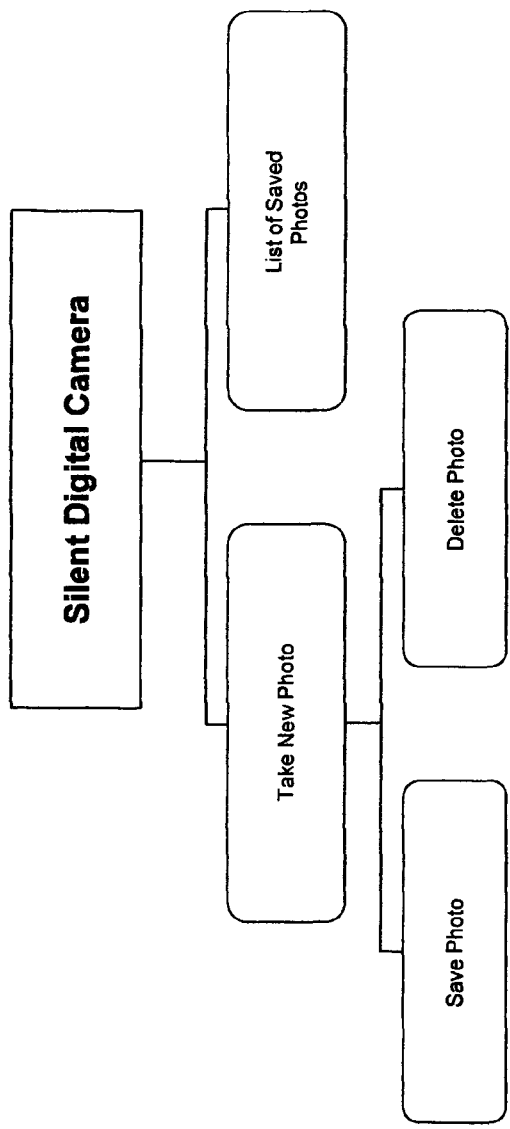
FIG. 21 is a flow diagram of views available for the button marked "Silent Digital Camera" of the embodiment shown in FIG. 8.
Figure 22:
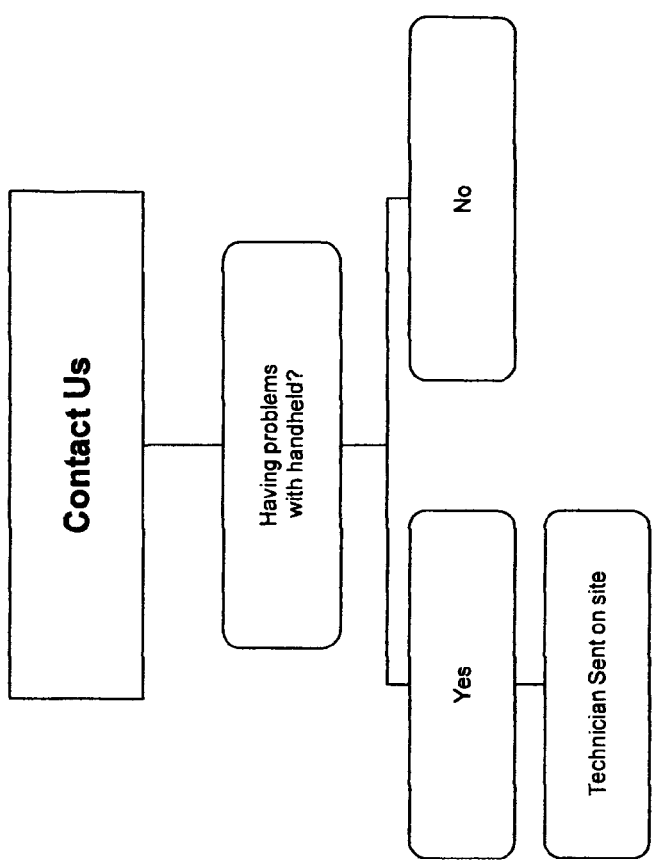
FIG. 22 is a flow diagram of views available for the button marked "Contact Us" of the embodiment shown in FIG. 8.
Figure 23:
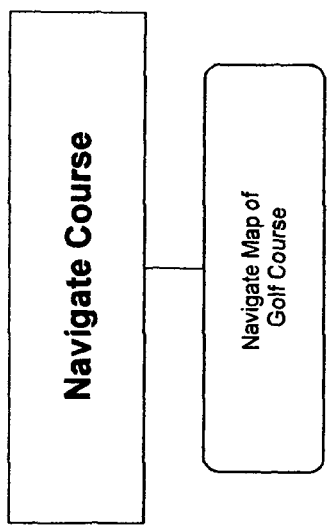
FIG. 23 is a flow diagram of views available for the button marked "Navigate Course" of the embodiment shown in FIG. 8.
Figure 24:
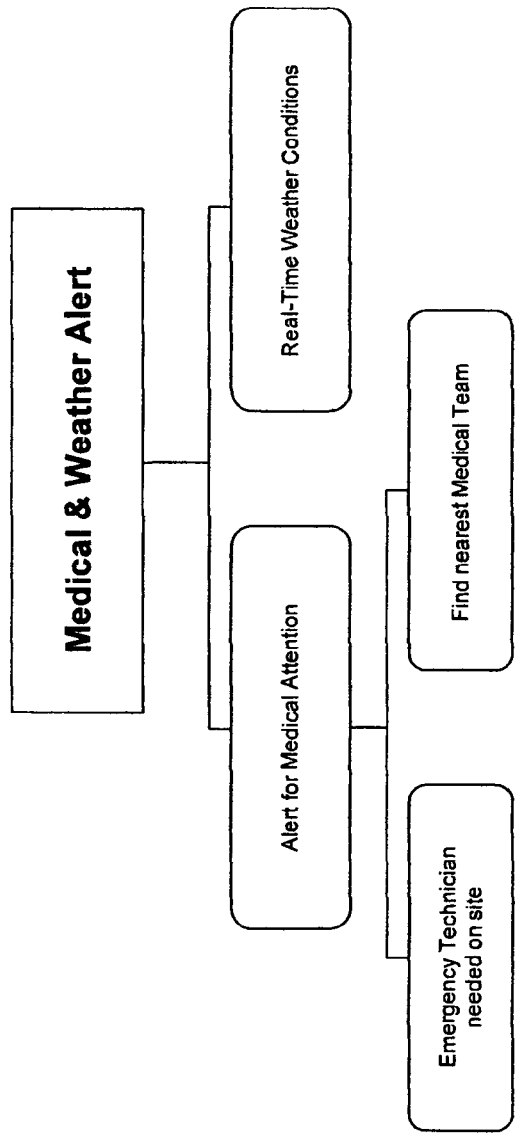
FIG. 24 is a flow diagram of views available for the button marked "Medical & Weather Alert" of the embodiment shown in FIG. 8.

FIG. 9 is a schematic drawing of the front display of the embodiment shown in FIG. 8. Each category button 36 triggers a display of menus leading to further information in that category. FIGS. 10-24 are flow diagrams of views available for each category button 36 shown in FIG. 9. These categories are "Player Finder", "Golf Hole Information", "Club Identifier", "TV Viewer", "Leader Board Information", "SHOT-LINK®", "Average Driving/Scoring", "Golf Tour Schedule", "Sponsor Information", "Golf Course Background", "Manufacturer Specials", "Silent Digital Camera", "Contact Us", "Navigate Course", and "Medical & Weather Alert". Topics may be arranged in different manners or other categories may be used instead of or in addition to those shown in the embodiments depicted in FIGS. 4-8.

The fourth aspect of the invention is the method aspect to enhance real-time awareness of a golf tournament. As mentioned earlier, golf tournament organizers severely restrict activities of spectators to minimize distractions to players that may unequally bias tournament play. Thus golf spectators are unable to know distances to other places such as hazards or pins or clubs used by players at a hole that spectators are watching. In addition, spectators are ignorant of the progress of play of holes they are not watching. The method of the invention permits a golf enthusiast who is not a spectator watching a hole in person to know for players of interest their real-time club selection and real-time location on holes being played. In addition, with the method, a golf tournament spectator is able to obtain that knowledge as well as an awareness of real-time activities of at least two players within a short span of time as well as other information that currently is available to offsite golf enthusiasts with internet access. The method for golf enthusiasts not watching tournament play in person includes the steps of (1) obtaining a remote information device described above and (2) selecting received visual information signals of interest from a group including the real-time club a selected player is using and the real-time location of the player on the course or the distance of the shot being taken.

The method for spectators includes the steps of (1) obtaining a portable spectator information device described above and (2) selecting received visual information signal of interest while able to watch a particular player on a particular hole. The method allows a spectator to obtain real-time data about the actions and location of the player they are watching, such as what club they are using for a shot having what distance and hazards, and follow the progress of at least two players on different holes within a short span of time. The span of time is typically less than five minutes and often shorter depending on how long a spectator wants to watch a selected piece of information and what type that information is. Video clips may take longer than player location. Club selection may be obtained quickly but subsequent observation of what a player does with the club may take longer.

Other modifications and changes regarding what information is available to a golf enthusiast, how that information is selected, and what navigation techniques are employed to move among the information will be apparent to those skilled in the art. The invention is not considered limited to the embodiments chosen for purposes of disclosure and covers all changes and modifications which do not constitute departures from the true spirit and scope of this invention.

We claim:

1. A system for conveying information to a viewer of a golf tournament who is not a tournament player, comprising,
a group of external input information signals where signals include for at least two tournament players at least a real-time identity of a club that each tournament player is using,
a command facility not within the vicinity the players for receiving the external input information signals and transmitting output information signals, and
a remote device able to convey transmitted visual information selected by only the viewer who is not a tournament player, comprising a receiver element for receiving transmitted signals conveying visual information, a display element for displaying selected visual information, and a selection element to enable only the viewer and not a tournament player to select the visual information desired to be displayed from a group including at least the real-time identity of the club that the viewer-selected tournament player has had removed from a golf bag used by the player.

2. The system of claim 1 wherein the external input information signals further include signals from a group consisting of real-time location of the viewer-selected tournament player on a course, player background information, golf course information, golf hole information, television transmissions with subtitles, leader board information, SHOT-LINK®, TOURCAST®, average driving or scoring on a hole, golf tour schedule, golf course background, weather announcements, information related to products used by players and information from tournament sponsors.

3. The system of claim 1 wherein the command facility also is able to modify at least some of the external input information signals to make them more spectator-informative before transmitting output information signals able to be received by the remote device.

4. The system of claim 1 wherein the visual information signals received by the remote device further include signals from a group consisting of real-time location of the viewer-selected tournament player on a course, player background information, golf hole information, television transmissions with subtitles, leader board information, SHOTLINK®, TOURCAST®, average driving or scoring on a hole, golf tour schedule, golf course background, weather announcements, information related to products used by players and information from tournament sponsors.

5. The system of claim 1 wherein the command facility transmits output information signals to a website and the remote device is a device able to receive and display information from the website in a selectable manner.

6. The system of claim 1 wherein the remote device is a portable device.

7. The system of claim 6 wherein the portable device is not able to receive or transmit audio information.

8. The system of claim 6 wherein the portable device further comprises a transmission element for transmitting signals from a group consisting of a medical alert to the command facility and camera images to a receiving site.

9. The system of claim wherein the receiving site is a memory card or the command facility.

10. The system of claim 1, further comprising,
a detection element affixed individually to each tournament player golf bag containing at least two clubs for detecting sensors on clubs within range of the detection element and
a signal-transmission device to transmit the identity of a club missing from the bag through the command facility and then only to the viewer and not to the player or other tournament players when the club is no longer proximate to the bag.

11. The system of claim 10 wherein the detection element detects sensors within a pre-selected range of the detection element.

12. The system of claim 11 wherein the detection element is proximate to the upper part of the golf bag and the range is less than about 120 centimeters.

13. The system of claim 11 wherein the detection element is proximate to the upper part of the golf bag and the range is less than about 60 centimeters.

14. The system of claim 10 wherein the detection element detects sensors that pass through a field emitted by the detection element.

15. The system of claim 1, further comprising,
a location element affixed individually to each golf bag of at least two tournament players for transmitting the global position of each bag to the command facility,
a map of the golf course with location coordinates, and
an element for combining location with map to obtain visual image of location of golf bag on golf course.

16. An apparatus, comprising,
a golf bag used by a tournament player containing at least two golf clubs,
an individually identifiable sensor affixed to each of at least two clubs in the golf bag,
a detection element affixed to the golf bag for detecting the sensors on the clubs within range of detection element and
a signal-transmission device configured to transmit to a remote viewer and not to the tournament player or other players in the tournament the real-time identity of the club that the tournament player has had removed from the golf bag so that it is no longer within range of the detection element.

17. The apparatus of claim 16 wherein the detection element detects sensors within a pre-selected range of the detection element.

18. The apparatus of claim 17 wherein the detecting element is proximate to the upper part of the golf bag and the range is less than about 120 centimeters.

19. The apparatus of claim 17 wherein the detecting element is proximate to the upper part of the golf bag and the range is less than about 60 centimeters.

20. The apparatus of claim 16 wherein the detection element detects sensors that pass through a field emitted by the detection element.

21. The apparatus of 16, further comprising,
a location element affixed individually to each golf bag of at least two players for transmitting the global position of each player bag to the command facility.

22. A portable information device for spectators of golf tournaments, comprising, an electrical receiving element configured to allow a spectator and not a tournament player to receive transmitted visual information signals from a command facility,
an electrical selection element configured to allow a spectator and not a tournament player to select among received visual information signals in a topical manner from a group that includes at least the real-time identity of a club that a spectator-selected tournament player has had removed from a golf bag used by the player,
a electrically-driven screen for conveying visual information to the spectator without a communication element for conveying audio information, and
a power source for energizing the electrical elements of the device.

23. The system of claim 22 wherein the transmitted visual information signals further include signals from a group consisting of real-time location of the spectator-selected tournament player on a course, player background information, golf course information, golf hole information, television transmissions with subtitles, leader board information, SHOTLINK®, TOURCAST®, average driving or scoring on a hole, golf tour schedule, golf course background, weather announcements, information related to products used by players and information from tournament sponsors, wherein the information received by the portable device is conveyed to a spectator in a spectator-friendly format.

24. The system of claim 22 wherein the portable device further comprises a transmission element for transmitting signals from a group consisting of a medical alert to the command facility and camera images to a receiving site.

25. The system of claim 24 wherein the receiving site is a memory card or the command facility.

26. A method of enhancing awareness of a golf tournament, comprising,
obtaining a remote device able to convey transmitted visual information selected by a tournament spectator and not a tournament player, comprising,
a receiver element for receiving transmitted signals conveying visual information,
a display element for displaying selected visual information, and
a selection element to enable the spectator to select the visual information desired to be displayed from a group including at least the real-time identity of the club that a spectator-selected tournament player has had removed from a golf bag used by the player; and
selecting by a tournament spectator and not a tournament player the received visual information signal of interest about a tournament player from a group including real-time identity of the club that the selected player has had removed from a golf bag used by the player.

27. The method of claim 26 wherein the group also includes the real-time location of the spectator-selected tournament player on a golf course.

28. The method of claim 26, further comprising,
selecting received visual information signal by the spectator and not the player of interest to the spectator about a different spectator-selected tournament player from a group including real-time identity of the club that the selected player has had removed from a golf bag used by the player,
wherein the two selections can occur within a short span of time.

29. The method of claim 28 wherein the span of time is less than 5 minutes.

30. A method of enhancing awareness of a golf tournament, comprising, obtaining a portable spectator information device by a spectator and not a tournament player, comprising,
   an electrical receiver element for a spectator and not a tournament player to receive transmitted visual information signals from a command facility,
   an electrical selection element for the spectator and not the tournament player to select among received visual information in a topical manner from a group that includes at least the type of club removed for a spectator-selected tournament player from a golf bag of the player,
   a electrically-driven screen for conveying visual information to the spectator and not the tournament player without an audio speaker, and
   a power source for energizing the electrical elements of the device; and
selecting by the spectator and not the tournament player of at least one received visual information signal of interest to the spectator about the spectator-selected tournament player being watched from a group including real-time identity of the club that the spectator-selected player has had removed from a golf bag used by the player.

31. The method of claim 30 wherein the group also includes the real-time location of the spectator-selected tournament player on a golf course.

32. The method of claim 30 wherein the portable device is not able to receive or transmit audio information.

33. The method of claim 30, further comprising,
   selecting by the spectator and not the tournament player of the received visual information signal of interest to the spectator about a different spectator-selected tournament player from a group including real-time identity of the club that the selected player has had removed from a golf bag used by the player,
   wherein the two selections can occur within a short span of time.

34. The method of claim 30 wherein the span of time is less than 5 minutes.

* * * * *